United States Patent [19]

Metzger et al.

[11] Patent Number: 5,098,947
[45] Date of Patent: Mar. 24, 1992

[54] WATERBORNE COATINGS AND BINDER SYSTEMS FOR USE THEREIN

[75] Inventors: Carl W. Metzger, Denkendorf; Hartmut Hauefler, Remseck; Jürgen Münch, Sachsenheim; Karl-Heinz Freese, Stuttgart; Ulrich Orth, Wesel, all of Fed. Rep. of Germany

[73] Assignee: Akzo NV, Arnhen, Netherlands

[21] Appl. No.: 424,016

[22] Filed: Oct. 19, 1989

[30] Foreign Application Priority Data

Oct. 21, 1988 [EP] European Pat. Off. ........ 88202352.6

[51] Int. Cl.$^5$ ................................................. C08F 8/30
[52] U.S. Cl. ................................... 524/507; 525/123; 525/127
[58] Field of Search ................. 525/123, 127; 524/507

[56] References Cited

U.S. PATENT DOCUMENTS

| | | |
|---|---|---|
| 3,522,218 | 7/1979 | Pedain et al. ............... 525/123 |
| 3,773,729 | 11/1973 | Wakimoto et al. . |
| 3,919,154 | 11/1975 | Chang et al. . |
| 3,953,644 | 4/1976 | Camelon et al. . |
| 4,213,886 | 7/1980 | Turner . |
| 4,476,271 | 10/1984 | Kano et al. . |
| 4,518,724 | 5/1985 | Kuwajima et al. . |
| 4,624,973 | 11/1986 | Kuwajima et al. . |
| 4,745,151 | 5/1988 | Noll et al. . |

FOREIGN PATENT DOCUMENTS

| | | |
|---|---|---|
| 0038127 | 10/1981 | . |
| 0251921 | 1/1986 | European Pat. Off. . |
| 0228142 | 7/1987 | . |
| 0238108 | 9/1987 | European Pat. Off. . |
| 0238222 | 9/1987 | . |
| 0242731 | 10/1987 | European Pat. Off. . |
| 0273530 | 7/1988 | . |
| 2211518 | 7/1974 | France . |
| 1447400 | 8/1976 | United Kingdom . |

*Primary Examiner*—Bernard Lipman
*Attorney, Agent, or Firm*—Louis A. Morris; James K. Poole

[57] ABSTRACT

A binder system is provided which is suitable for use as a waterborne coating, particularly as a topcoat over hydro-basecoats. The binder in accordance with the present invention comprises a water-soluble acrylic resin which has been modified using a monoisocyanate functional compound. The waterborne coating comprises this binder system in an aqueous base. The resulting waterborne coating exhibits high gloss, high solids content with low cosolvent content, good application characteristics, and good stone-chip and weathering resistance. The present waterborne coating also finds use, for example, as an electrocoat, primer/surfacer and/or solid color topcoat.

37 Claims, No Drawings

WATERBORNE COATINGS AND BINDER SYSTEMS FOR USE THEREIN

BACKGROUND OF THE INVENTION

The present invention relates generally to waterborne coatings. More particularly, the present invention relates to acrylic-based binder systems for waterborne coatings and the waterborne coatings produced from such binder systems.

The emphasis on environmental protection together with increasingly restrictive legislation has led to the increased use of coatings based upon water rather than organic solvents.

Although waterborne primer/surfacers may now be considered normal state-of-the-art coatings in the automobile industry, color topcoats continue to represent a major source of organic solvent pollution. When it is considered that current, conventional, solid-color topcoats contain 50% or more organic solvents and that some 5 kg of paint are required to coat a compact car, it is clear that the total solvent emission from this source is substantial.

The increasingly popular clear-over-base metallic finishes exacerbate this problem, with the basecoat alone presently accounting for 50% of total emissions from the paint line. Such basecoats may contain up to 88% solvent and require a final clear coating which itself may have 50% or more organic solvent content.

Considerable work has, therefore, been undertaken to replace these solvent-based coatings with higher solids and waterborne systems, and major efforts have been concentrated on the metallic basecoats. Various systems have been proposed and examples are described in EP-A-228 142, EP-A-238 222, EP-A-242 731, EP-A-251 921 and U.S. Pat. No. 4,213,886, all of which are hereby incorporated by reference. Conventional clearcoats or two-component clearcoats with higher solid contents (60–65%) are proposed as final coatings for these basecoats.

The use of conventional organic solvent-based topcoats with the hydrobasecoats, however, leads to problems. In the "wet-in-wet" application of the solvent-based topcoat to the hydro-basecoat, for example, appearance defects due to "strike-in" phenomena may be produced. To minimize this, an expensive and time consuming pre-dry step must be utilized for the basecoat. Additionally, organic solvents utilized in the conventional topcoats remain a source of pollution.

It would, therefore, be highly desirable to produce a waterborne coating which finds utility, in part, as a topcoat for hydro-basecoats. Additionally, such waterborne coating should desirably have physical and mechanical properties comparable to conventional coating materials, should be easy to apply (i.e., using the wet-in-wet method), and should not exhibit "strike-in" phenomena when so applied. It should also possess good pigment/extender wetting and dispersion properties for use in pigmented forms such as surfacers, solid-color topcoats and the like.

Waterborne coatings produced from water-soluble acrylic and/or polyester resin binder systems have been described in the literature and utilized commercially, but only with limited success as topcoats for hydro-basecoats. As topcoats, they generally exhibit unfavorable rheology, and require the use of large amounts of amines or cosolvents to lower viscosity sufficiently for reliable application and to ensure stability of the system. This, however, results in poor appearance (solvent "strike-") and also in a low solids content which makes it difficult to reach the required film thickness with normal application methods.

More recently, waterborne topcoats have been produced from "hybrid" binder systems comprising combinations of water-soluble reins with aqueous dispersion resins. An example is the combination of Synthacryl 6483 (a commercial acrylic dispersion) with Synthacryl 6484 (a commercial water soluble acrylic resin), which is recommended by the Hoechst AG as a water-based clearcoat for two-coat metallic finishes. Other examples are described in U.S. Pat. Nos. 3,919,154; 3,953,644; 4,518,724; and 4,624,973, all of which are hereby incorporated by reference. The resulting waterborne coatings display somewhat improved properties, but rheology and low solids content problems remain. Also, the waterborne coatings utilizing these hybrid binder systems normally still require large amounts (20–25%) of cosolvents, resulting in a topcoat with less than ideal appearance characteristics, sagging on application and a tendency to solvent-popping on drying.

SUMMARY OF THE INVENTION

The present invention provides a waterborne coating especially well suited for use as a topcoat over hydro-basecoats, and a process for producing such waterborne coatings.

In its overall concept, the waterborne coating of the present invention comprises an acrylic-based binder system in an aqueous base. The binder system comprises a water-soluble acrylic resin which has been modified with a monofunctional isocyanate compound.

The water-soluble acrylic resin may be modified with the monofunctional isocyanate compound, for example, by (1) reacting the resin directly with the monofunctional isocyanate compound, or (2) reacting a hydroxyacrylic monomer with the monofunctional isocyanate compound, then (co)-polymerizing the resulting urethane modified monomer, to produce the water-soluble resin, as further discussed below.

Thus, the modified water-soluble acrylic resin is the reaction product of a monofunctional isocyanate compound with a water-soluble acrylic resin or is the polymerization product of a urethane-modified acrylic monomer built up from a hydroxyacrylic monomer and a monofunctional isocyanate.

It should be noted that, as utilized herein, the term "monofunctional isocyanate compound" is not intended to include compounds also containing a "blocked" isocyanate group, which becomes unblocked during normal curing conditions of the binder (i.e., at temperatures below about 160° C.). In other words, for example, compounds containing a "free" isocyanate group and a "blocked" isocyanate group are, for the purposes of the present invention, to be considered polyfunctional isocyanate compounds.

To increase the solids content and/or modify the rheology of the binder system and ultimate waterborne coating, an aqueous dispersion resin, preferably an aqueous acrylic dispersion resin, may be utilized as an optional component of the binder system.

A waterborne coating may be produced from the binder system by any one of a number of well-known techniques.

The resulting waterborne coating in accordance with the present invention displays high gloss, high solids content with low cosolvent content, good application characteristics, and good stone-chip and weathering resistance, making it especially well suited for use as a topcoat over a hydro-basecoat. The waterborne coating may also find use in pigmented form as an electrocoat, primer/surfacer and/or solid color topcoat.

These and other features and advantages of the present invention will be more readily understood by one skilled in the art from a reading of the following detailed description.

DETAILED DESCRIPTION OF THE PREFERRED EMBODIMENTS

As previously mentioned, the waterborne coatings of the present invention comprise an acrylic-based binder system in an aqueous base. The binder system of the present invention comprises, in its overall concept, a water-soluble acrylic resin which has been modified with a monofunctional isocyanate compound.

Suitable water-soluble acrylic resins are those produced from the polymerization of one or more hydroxyacrylic monomers. Copolymers of such hydroxyacrylic monomers with one or more other olefinically unsaturated monomers, as further described below, are especially suitable. The water-soluble acrylic resins are preferably anionic in character with an average molecular weight (Mn) of between 500 to 20,000, a hydroxyl number within the range of 10 to 400 (mg KOH/g resin) and an acid value of from 5 to 150 (mg KOH/g resin). After at least partial neutralization of the carboxyl groups with, for example, an amine, these water-soluble acrylic resins give clear, stable solutions in water.

In preferred embodiments, such water-soluble acrylic resins are produced by the free-radical polymerization of from 10 to 100, more preferably 20 to 80, parts by weight of hydroxyacrylic monomer with 0 to 90, more preferably 20 to 80, parts by weight other copolymerizable monomer. Parts by weight here is based upon 100 parts by weight total monomer mixture.

Suitable hydroxyacrylic monomers comprise the hydroxy-substituted esters of acrylic and methacrylic acid, more preferably the $C_1$-$C_{10}$ alkyl esters. Particularly preferred include, for example, hydroxypropyl methacrylates, hydroxyethyl acrylates and hydroxyethyl methacrylates.

Suitable other olefinically unsaturated comonomers include those normally utilized in producing water-soluble acrylic resins such as, for example, acrylic and methacrylic acid and their $C_1$-$C_{10}$ alkyl esters; glycidyl acrylate and methacrylate; other acrylic and methacrylic acid derivatives such as acrylamide, acrylonitrile and acrolein; polyethyleneglycol monoacrylate and methacrylate; vinyl aromatics such as styrene and vinyl toluene; maleic and fumaric acid; and the like. Particularly preferred are the $\alpha,\beta$-ethylenically unsaturated monomers, especially butyl methacrylate, butylacrylate, 2-ethylhexyl acrylate, methacrylic acid and methyl methacrylate. If self-crosslinking of the binder is desired, it is also particularly preferred to include acrylamide derivatives such as N-methylolacrylamide and N-methoxymethylacrylamide.

The binder system of the present invention is produced by modifying these water-soluble acrylic resins with a monofunctional isocyanate-compound. Preferred monofunctional isocyanate compounds are those selected from:

(a) monoisocyanate compounds, and
(b) adducts of polyisocyanates with active hydrogen group-containing (single primary reactive group) compounds.

As mentioned above, the term "monofunctional isocyanate compound" is not intended to include compounds containing a "blocked" isocyanate group, which becomes unblocked during normal curing conditions of the binder.

As examples of suitable monoisocyanate compounds may be mentioned those of the general formula (I):

$$R-NCO \qquad (I)$$

wherein R is a $C_8$-$C_{25}$ alkyl group, preferably a linear alkyl group, with stearyl isocyanate ($C_{18}$) being particularly preferred.

As examples of suitable polyisocyanates may be mentioned aliphatic, cycloaliphatic and aromatic di, tri or tetra isocyanates (isocyanate functionality 2 to 4) such as 1,2-propylene diisocyanate,
trimethylene diisocyanate,
tetramethylene diisocyanate,
2,3-butylene diisocyanate,
hexamethylene diisocyanate,
octamethylene diisocyanate,
2,2,4-trimethylhexamethylene diisocyanate,
2,4,4-trimethylhexamethylene diisocyanate,
dodecamethylene diisocyanate,
w,w'-dipropyl ether diisocyanate,
1,3-cyclopentane diisocyanate,
1,2-cyclohexane diisocyanate,
1,4-cyclohexane diisocyanate,
isophorone diisocyanate,
4-methyl-1,3-diisocyanatocyclohexane,
trans-vinylidene diisocyanate,
dicyclohexyl methane-4,4'-diisocyanate,
3,3'-dimethyl-dicyclohexyl methane-4,4'-diisocyanate,
a toluene diisocyanate,
1,3-bis(isocyanatomethyl)benzene,
a xylylene diisocyanate,
1,5-dimethyl-2,4-bis(isocyanatomethyl)benzene,
1,5-dimethyl-2,4-bis(2-isocyanatoethyl)benzene,
1,3,5-triethyl-2,4-bis(isocyanatomethyl)benzene,
4,4-diisocyanato-diphenyl, 
3,3'-dichloro-4,4'-diisocyanatodiphenyl,
3,3'-diphenyl-4,4'-diisocyanatodiphenyl,
3,3'-dimethoxy-4,4'-diisocyanatodiphenyl,
4,4'-diisocyanatodiphenyl methane,
3,3'-dimethyl-4,4'-diisocyanatodiphenyl methane,
a diisocyanatonaphthalene,
the adduct of 2 molecules of a diisocyanate (for instance hexamethylene diisocyanate or isophorone diisocyanate) and a diol such as ethylene glycol, the adduct of 3 molecules of hexamethylene diisocyanate and 1 molecule of water (available under the trademark Desmodur N of Bayer), the adduct of 1 molecule of trimethylol propane and 3 molecules of toluene diisocyanate (available under the trademark Desmodur L of Bayer), the adduct of 1 molecule of trimethylol propane and 3 molecules of isophorone diisocyanate, compounds such as
1,3,5-triisocyanatobenzene,
2,4,6-triisocyanatoluene,
isocyanurate group-containing isocyanate compounds, and the adduct of 1 molecule of pentaerythritol and 4 molecules of toluene diisocyanate, or mixtures of 2 or more of the above-envisaged isocyanate compounds. It is especially preferred that use should be made of a diisocyanate or triisocyanate containing 8–36 carbon atoms.

Particularly preferred polyisocyanates include hexamethylene diisocyanate, tetramethylxylene diisocyanate, trimethylhexane diisocyanate, toluene diisocyanate, cyclohexyl diisocyanate, diphenylmethane diisocyanate and their cyclic trimeric forms as isocyanurates; and aliphatic di- and tri-isocyanates such as trimer hexamethylene diisocyanate (Desmodur N) and isophorone diisocyanate.

As suitable active hydrogen group-containing compounds may be mentioned monohydroxy functional compounds, monoamine functional compounds and monothiol functional compounds. Preferred are the monohydroxy and monoamine functional compounds.

It should be noted that the active hydrogen-group containing compounds may also contain more than one type of active hydrogen group, as exemplified further below. The term "active hydrogen group-containing" compound, however, is not intended to cover those compounds having more than a single primary reactive active hydrogen group.

As examples of preferred monohydroxy functional compounds may be mentioned one or more of the following:

(1) a monohydroxy substituted carboxylic compound of the general formula (II):

$$HO-R^1-COOR^2 \qquad (II)$$

wherein $R^1$ is a hydrocarbon group having from 1 to 25 carbon atoms, and $R^2$ is hydrogen or a hydrocarbon group having from 1 to 18 carbon atoms. More preferred are the group of hydroxy fatty acids and their esters where $R^1$ is an aliphatic hydrocarbon group having from 4 to 24 carbon atoms, and $R^2$ is hydrogen or a $C_1$–$C_{18}$ alkyl group. Especially preferred are those hydroxy fatty acids where $R^1$ is an aliphatic, linear, saturated hydrocarbon group having from 12 to 20 carbon atoms and $R^2$ is hydrogen, whereby hydroxy stearic acid is particularly preferred.

(2) a monoalcohol of the general formula (III):

$$HO-R^3 \qquad (III)$$

wherein $R^3$ is a hydrocarbon group having from 1 to 25 carbon atoms. More preferred are those alcohols where $R^3$ is a $C_1$–$C_{18}$ alkyl group, with ethanol, butanol, lauryl alcohol and stearyl alcohol being particularly preferred.

(3) a polyoxyalkylene glycol monoalkylether of the general formula (IV):

$$HO-[(C_3H_6O)_n/(C_2H_4O)_{nl}]-R^4 \qquad (IV)$$

wherein $R^4$ is a $C_1$–$C_4$ alkyl group, n is 0 or a whole number from 1 to 25, and Nl is 0 or a whole number from 2 to 40, with the proviso that $1 \leq n+nl \leq 50$. The combination of n being 0, nl being from 10 to 12 and $R^4$ being a methyl group is especially preferred.

(4) a monohydroxy substituted carboxamide compound of the general formula (V):

$$HO-R^1-CON(R^5)_2 \qquad (V)$$

wherein $R^1$ is as defined above, and each $R^5$ may independently be hydrogen or a hydrocarbon group having from 1 to 18 carbon atoms.

As examples of preferred monoamine functional compounds may be mentioned one or more of the following:

(5) a monoamine of the general formula (VI):

$$R^6-HN-R^3 \qquad (VI)$$

wherein $R^3$ is as defined above, and $R^6$ is hydrogen or a hydrocarbon group having 1 to 25 carbon atoms, with the proviso that the monoamine (5) should not contain more than 26 carbon atoms in total. The combination of $R^3$ being a $C_1$–$C_{18}$ alkyl group and $R^6$ being hydrogen is especially preferred, with ethylamine, butylamine, laurylamine and stearylamine being particularly preferred.

(6) a polyoxyalkyleneamine monoalkylether of the general formula (VII):

$$R^7-HN-[(C_3H_6O)_n/(C_2H_4O)_{nl}]-R^4 \qquad (VII)$$

wherein $R^4$, n and nl are as defined above, and $R^7$ is hydrogen, a $C_1$–$C_{20}$ alkyl group or a polyoxyalkylene group of the formula $[(C_3H_6O)_n/(C_2H_4O)_{nl}]$, wherein n and nl are as defined above. The combination of $R^7$ being hydrogen, $R^4$ being a methyl group, n being from 2 to 4 and nl being from 16 to 20 is especially preferred.

As examples of preferred monothiol functional compounds may be mentioned one or more of the following:

(7) monothiol substituted carboxylic acids and esters of the general formula (VIII):

$$HS-R^8-COOR^2 \qquad (VIII)$$

wherein $R^2$ is as defined above and $R^8$ is a hydrocarbon group having 1 or 2 carbon atoms.

(8) monothiols of the general formula (IX):

$$HS-R^9 \qquad (IX)$$

wherein $R^9$ is a hydrocarbon group having from 2 to 12 carbon atoms.

The monofunctional isocyanate adduct of the polyisocyanate and active hydrogen group-containing compound is produced by reacting the components, by any well-known manner, in an amount whereby one mole of polyisocyanate is reacted with $X-1$ moles of active hydrogen group-containing compound, wherein X is the number of isocyanate groups (as indicated before, preferably 2 to 4) per polyisocyanate molecule. In other words, if a diisocyanate is utilized, the mole ratio of diiso- cyanate to active hydrogen group-containing compound will be 1:1; if a triisocyanate is utilized, the mole ratio will be 1:2; a tetraisocyanate 1:3; and so on. The resulting adduct, therefore, will have an average of one isocyanate group per molecule (monofunctional isocyanate).

As previously mentioned, the water-soluble acrylic resin is reacted with the monofunctional isocyanate compound to produce the binder systems of the present invention. Generally, from about 1 to about 40, more preferably from about 1 to about 20, parts by weight of the monofunctional isocyanate is reacted with from about 60 to about 99, more preferably from about 80 to about 99, parts by weight of the acrylic resin, the combination comprising 100 parts by weight.

Various reaction schemes for the water-soluble acrylic resins and monofunctional isocyanate compounds can be envisioned. In a first preferred reaction scheme, the water-soluble acrylic resin is reacted directly with the monofunctional isocyanate compound, in the amounts as described above, to produce the binders of the present invention.

In an alternative preferred reaction scheme, at least one mole of the hydroxyacrylic monomer is reacted per mole of the monofunctional isocyanate compound to produce a urethane modified acrylic monomer. This monomer is then polymerized, and/or copolymerized with additional hydroxyacrylic monomer and/or other olefinically unsaturated monomers, in the amounts and of the types as described above, by well-known free-radical initiated polymerization methods to produce the binders of the present invention.

To increase the solids content and/or modify the rheology of the binder system, an aqueous dispersion resin may be added to, or produced in situ within, the modified water-soluble acrylic resin. In preferred embodiments, the binder system may comprise an additional 100 parts by weight or less, more preferably an additional 10 to 70 parts by weight, of the aqueous dispersion resin.

Aqueous dispersion resins suitable for use with the binders of the present invention include non-ionic or anionic dispersions of acrylic, polyurethane and other synthetic resins, preferred use being made of aqueous acrylic dispersion resins. Such dispersions also include internally cross-linked dispersions ("microgels") as described in, for example, EP-A-38 127, EP-A-238 108 and EP-A-273 530, all of which are hereby incorporated by reference. A wide variety of dispersion resins may be utilized based upon the desired end-use of the resulting coating, and one skilled in the art can easily choose the type and characteristics of the dispersion resins utilized for a particular desired end-use.

As pre-pared components, such aqueous dispersion resins are well-known in the art and generally commercially available. For example, for a clearcoat having good weather resistance, film hardness, solvent resistance and like characteristics, an aqueous acrylic dispersion typified by Synthacryl VSW 6483 (Hoechst AG) or Neocryl XK62 (Polyvinyl Chemie) may be used. For a surfacer requiring somewhat more elasticity, improved stone-chip resistance and sandability, a polyurethane typified by Neorez R 974 (Polyvinyl Chemie) may be used.

When used as a pre-pared component, the aqueous dispersion resin is added to the modified acrylic resin by simple blending of the two components. When made in situ, such aqueous dispersion resin is formed within the modified acrylic resin by well-known procedures, for example, as taught in U.S. Pat. No. 3,919,154, previously incorporated by reference.

The resulting binder system in accordance with the present invention should be characterized by an acid value of from about 5 to about 150 (mg KOH/g resin), more preferably from about 10 to about 70, and still more preferably from about 15 to about 35, and an hydroxyl number of about 20 to about 250 (mg KOH/g resin), more preferably from about 40 to about 150.

The aforedescribed binder systems are utilized to produce waterborne coatings by blending with other suitable components in accordance with normal paint formulation techniques. Typically, the modified water-soluble acrylic resin is at least partially neutralized with, for example, an amine, then charged into a vessel with the other components being sequentially blended using normal stirring techniques. The viscosity of the mixture is adjusted finally with demineralized water to obtain the desired application properties. If a pigmented system is desired, a mill-base can be prepared comprising the major part of the pigment dispersed in at least a portion of the water-soluble resin by means of sand-milling, ball-milling etc. The mill-base is subsequently "let-down" by blending with the remaining binder and other components, then adjusted to the desired viscosity.

The so-produced coating may also contain a curing agent for the binder. Such curing agents include, for example, N-methylol groups and/or N-methylol ether groups-containing amino resins obtained by reacting an aldehyde, such as formaldehyde, with a compound containing amino groups or amide groups such as melamine, urea, N,N'-ethylene diurea, dicyandiamide and benzoguanamine (for the preparation of such compounds see Houben-Weyl, Methoden der organischen Chemie, Band 14/2, pp. 319–371 (1963)).

It is preferred that the afore-described compounds should entirely or partly be etherified with alcohols having 1 to 6 carbon atoms, for instance with methanol, ethanol, n-propanol, isopropanol, n-butanol, isobutanol, amyl alcohol, hexanol or mixtures of the alcohols referred to above. Particularly, use is made of a methylol melamine containing 4 to 6 methylol groups per molecule of melamine, at least 3 methylol groups being etherified with methanol, ethanol, a propanol or a butanol, or a butanol-etherified condensation product of formaldehyde and N,N'-ethylene diurea. More particularly, use is made of a hexaalkoxymethyl melamine whose alkoxy group contains 1 to 4 carbon atoms.

Other well-known additives such as, for example, antioxidants, ultraviolet absorbers, cosolvents, levelling agents, rheology control agents, pigments, colorants and the like, may be utilized in the waterborne coating of the present invention without unduly affecting the properties thereof. In fact, without a pigment or colorant the waterborne coating as described above may be utilized as a clearcoat. With the pigmentation, the waterborne coating may be utilized as a colored topcoat. These waterborne coatings also find use as electrocoats and primer/surfacers.

The coatings according to the invention may be applied to a substrate in any desirable manner, such as by roller coating, spraying, brushing, sprinkling, flow coating, dipping, electrostatic spraying or electrophoresis.

Curing may be carried out at ambient temperature or at elevated temperature to reduce the curing time. Preferably, the coating may be baked at higher temperatures in the range of, for instance, 60° C. to 160° C., in a baking oven over a period of 10 to 60 minutes.

The foregoing more general discussion of this invention will be further exemplified by the following specific examples offered by way of illustration and not limitation of the above-described invention.

EXAMPLES

Preparation of Binders

Method A: Urethane Modified Monomer
Modified Monomer 1 (MM1)
0.75 moles Desmodur N, 1.5 moles 12-hydroxy stearic acid, 975 g diethylene glycol dimethylether and 1% (based on the weight of Desmodur N) of dibutyltin dilaurate were placed in a 2 liter, four-necked round-bottom flask fitted with a stirrer, thermometer and gas inlet tube, and stirred together for 4 hours at 60° C.

0.75 moles 1-hydroxypropyl methacrylate and 0.5% dibutyltin dilaurate (based on the weight of the 2-hydroxypropyl methacrylate) were subsequently added and the mixture stirred until the IR-spectrum of a sample showed no isocyanate groups to be present.

After completion of the reaction, 100 ppm of the monomethylether of hydroquinone were added as a stabilizer. The solids content of the solution was about 50%.

Modified Monomer 2 (MM2)

The procedure of MM1 was repeated with 1.5 moles of Breox MPEG 550 (a methoxy polyethyleneglycol of mean molecular weight 550 from BP Chemicals) being used in place of the 12-hydroxy stearic acid.

The solids content of the solution was adjusted to about 50% by adjustment of the solvent (diethylene glycol dimethylether).

Modified Monomer 3 (MM3)

1.0 mole IPDI (isophorone diisocyanate from Veba-Chemie AG), 1.0 mole 12-hydroxy stearic acid, 666 g diethylene glycol dimethylether and 0.1% (based on the weight of IPDI) of dibutyltin dilaurate were placed in a 2 liter, four-necked round-bottom flask fitted with a stirrer, thermometer and gas inlet tube, and stirred together for 4 hours at 50° C.

1.0 mole 2-hydroxypropyl methacrylate and 1.0% dibutyltin dilaurate (based on the weight of the 2-hydroxypropyl methacrylate) were subsequently added and the mixture stirred until the IR-spectrum of a sample showed no isocyanate groups to be present.

After completion of the reaction, 100 ppm of the monomethylether of hydroquinone were added as a stabilizer. The solid content of the solution was about 50%.

Modified Monomer 4 (MM4)

The procedure of MM3 was repeated with ethanol being used in place of the 12-hydroxy stearic acid.

The solids content of the solution was adjusted to about 50% by adjustment of the solvent (diethylene glycol dimethylether).

Modified Monomer 5 (MM5)

The procedure of MM1 was repeated with 1.5 moles of Polyglykol B01/20 (a polypropyleneglycol monobutyl ether of mean molecular weight 700 from Hoechst) being used in place of the 12-hydroxy stearic acid.

The solids content of the solution was adjusted to about 50% by adjustment of the solvent (diethylene glycol dimethylether).

Modified Monomer 6 (MM6)

The procedure of MM3 was repeated with 1.0 moles of Jeffamine M 1000 (a polyoxyalkylene monoamine of mean molecular weight 1000 from Texaco Chemical Company) being used in place of the 12-hydroxy stearic acid.

The solids content of the solution was adjusted to about 50% by adjustment of the solvent (diethylene glycol dimethylether).

Binder 1 (B1)

A 2 liter, four-necked round-bottom flask fitted with a stirrer, thermometer and gas inlet tube was charged under nitrogen with 300 parts by weight diethylene glycol monobutylether, 46.7 parts by weight Trigonox K 80 (cumene hydroperoxide based initiator from Akzo Chemie), and 10% of weight of the total of a mixture of acrylic monomers consisting of 526 parts by weight butyl acrylate, 235 parts by weight methyl methacrylate, 170 parts by weight 2-hydroxypropyl methacrylate, 50 parts by weight methacrylic acid and 100 parts by weight of MM1. The charge was heated to 140° C. and the remainder of the acrylic monomer mixture was added over a period of 3.5 hours, being allowed to polymerize over a further 3 hours.

The final solution of acrylic resin had a solids content of 74.5% and the resin had an acid value of 33.5 and an hydroxyl value of 65.

Binder 1 (B2)

The procedure of B1 was repeated using 100 parts by weight of MM2.

The resin solution had a solids content of 73.5% and the resin had an acid value of 30.4 and an hydroxyl value of 65.

Binder 3 (B3)

The procedure of B1 was repeated using 100 parts by wight of MM3.

The resin solution had a solids content of 74.3% and the resin had an acid value of 32.3 and an hydroxyl value of 65.

Binder 4 (B4)

The procedure of B1 was repeated using an acrylic monomer-mixture comprising 415 parts by weight butyl acrylate, 186 parts by weight methyl methacrylate, 17 parts by weight 2-hydroxypropyl methacrylate, 50 parts by weight methacrylic acid acid and 400 parts by weight of MM4.

The resin solution had a solids content of 74.1% and the resin had an acid value of 33.7 and an hydroxyl value of 65.

Binder 5 (B5)

The procedure of B1 was repeated using 100 parts by weight of MM5.

The resin solution had a solids content of 75.3% and the resin had an acid value of 35.0 and an hydroxyl value of 65.

Binder 6 (B6)

The procedure of B1 was repeated using 100 parts by weight of MM6.

The resin solution had a solids content of 75.6% and the resin had an acid value of 44.6 and an hydroxyl value of 65.

Method B: Urethane Modified Resin

Urethane Component 1 (UC1)

0.75 moles Desmodur N, 1.5 moles 12-hydroxy stearic acid, 866 g diethylene glycol dimethylether and 0.5% (based on the weight of Desmodur N) of dibutyltin dilaurate were placed in a 2 liter, four-necked round-bottom flask fitted with a stirrer, thermometer and gas inlet tube, and stirred together for 6 hours at 60° C.

The resulting solution had a solids content of about 50% and an isocyanate functionality of 1.

Urethane Component 2 (UC2)

1.0 mole IPDI (isophorone diisocyanate), 1.0 mole 12-hydroxy stearic acid, 522 g diethylene glycol dimethylether and 0.1% (based on the weight of IPDI) of dibutyltin dilaurate were placed in a 2 liter, four-necked round-bottom flask fitted with a stirrer, thermometer and gas inlet tube, and stirred together for 6 hours at 50° C.

The resulting solution had a solids content of about 50% and an isocyanate functionality of 1.

Binder 7 (B7)

A 2 liter, four-necked, round-bottom flask fitted with a stirrer, thermometer and gas inlet tube was charged under nitrogen with 300 parts by weight diethylene glycol dimethylether and heated to 145° C. A mixture of acrylic monomers and initiator comprising 526 parts by weight butyl acrylate, 175 parts by weight 2-hydroxypropyl methacrylate, 235 parts by weight methyl methacrylate, 50 parts by weight methacrylic acid and 35 parts by weight Trigonox 42S (t-butylperoxy-3.5.5. trimethyl hexanoate from Akzo Chemie) was subsequently added over a period of 3.5 hours and allowed to polymerise for a further 1 hour.

After cooling to 70° C., 100 parts by weight of UC1 was added and the mixture stirred until the IR-spectrum of a sample showed no isocyanate groups to be present.

The resin solution had a solids content of 74.8% and the resin had an acid value of 32.7 and an hydroxyl value of 65.

Binder 8 (B8)

The procedure of B7 was repeated using 100 parts by weight of UC2.

The resin solution had a solids content of 74.3% and the resin had an acid value of 33.2 and an hydroxyl value of 65.

It should be noted that B7 and B8, produced by the alternative route of Method B, were found to be indistinguishable in properties such as viscosity, rheology, stability, etc. from B1 and B3, respectively, produced via Method A.

Comparative Binder 1 (CB1)

For comparison purposes B7 was repeated without any urethane component being employed.

The resulting acrylic resin solution had a solids content of 74.5% and the resin had an acid value of 34.3 and an hydroxyl value of 67.

PREPARATION OF COATING EXAMPLES

COMPARATIVE EXAMPLE 1 (CE1)

Hybrid System

A waterborne clearcoat with the following composition was prepared from commercially available materials:

| | |
|---|---|
| Synthacryl VSW 6484 (aqueous acrylic dispersion, Hoechst AG) | 67.6 parts by weight |
| Maprenal MF 915 (methylated melamine-formaldehyde resin, Hoechst AG) | 26.9 parts by weight |
| Maprenal MF 927 (methylated melamine-formaldehyde resin, Hoechst AG) | 3.5 parts by weight |
| Additol XW 329 (leveling agent, Hoechst AG) | 0.1 parts by weight |
| Demineralized water | 43.0 parts by weight |
| Synthacryl VSW 6483 (aqueous acrylic dispersion, Hoechst AG) | 48.4 parts by weight |
| Sandovur 3212 (UV-absorber and light stabilizing agent, Sandoz AG) | 3.2 parts by weight |
| Demineralized water | 22.3 parts by weight |

The materials were blended in the order given and the resulting clear-coat was allowed to stand overnight before being adjusted to an application viscosity of 60 s (DIN 53211) with demineralized water. The clearcoat had a solids content of 38% and contained 19% organic cosolvent.

COMPARATIVE EXAMPLE 2 (CE2)

No urethane component

A waterborne clearcoat was prepared with the following composition:

| | |
|---|---|
| Comparative Binder 1 (CB1) | 56.4 parts by weight |
| Dimethylethanolamine | 1.1 parts by weight |
| Cymel 327 (methylated melamine-formaldehyde resin, American Cyanamid Co.) | 33.3 parts by weight |
| Butyl diglycol | 12.0 parts by weight |
| Paint Additive 11 (mar resistance agent, Dow Corning GmbH) | 0.5 parts by weight |
| Additol XW 395 (leveling and wetting agent, Hoechst AG) | 0.2 parts by weight |
| Tinuvins 1130 + 292 (3:2) (UV absorber + light stabilizer, Ciba-Geigy AG) | 2.5 parts by weight |
| Demineralized water | 60.0 parts by weight |
| Synthacyl 6483 | 57.1 parts by weight |

The materials were blended in the order given and the resulting clear-coat was allowed to stand overnight before being adjusted to an application viscosity of 23 s (DIN 53211) with demineralized water. The clearcoat had a solids content of about 46% and contained about 13% organic cosolvent.

COMPARATIVE EXAMPLE 3 (CE3)

A conventional acrylic/melamine clearcoat, as used in the automobile industry, was used as a comparative example. The material is commercially available from Akzo Coatings GmbH under the designation "05-10077 AY-Klarlack".

EXAMPLE (E1)

CE2 was repeated using 56.4 parts of B1 in place of CB1.

The resulting clearcoat had a solids content of about 46% and contained about 13% organic cosolvent.

EXAMPLE 2 (E2)

CE2 was repeated using 57.1 parts of B2 in place of CB1 and 1.0 parts of dimethylethanolamine.

The resulting clearcoat had a solids content of about 46% and contained about 13% organic cosolvent.

EXAMPLE 3 (E3)

CE2 was repeated using 56.5 parts of B3 in place of CB1.

The resulting clearcoat had a solids content of about 46% and contained about 13% organic cosolvent.

EXAMPLE 4 (E4)

CE2 was repeated using 56.7 parts of B4 in place of CB1.

The resulting clearcoat had a solid content of about 46% and contained about 13% organic cosolvent.

EXAMPLE 5 (E5)

CE2 was repeated using 55.8 parts of B5 in place of CB1 and 1.2 parts of dimethylethanolamine.

The resulting clearcoat had a solids content of about 42% and contained about 13% organic cosolvent.

EXAMPLE 6 (E6)

CE2 was repeated using 55.6 parts of B6 in place of CB1 and 1.0 parts of dimethylethanolamine.

The resulting clearcoat had a solids content of about 44% and contained about 13% organic cosolvent.

The mechanical properties of the above coatings were investigated by applying a 35–40 um dry film thickness layer to an untreated, bare steel panel by pneumatic spraying and baking for 15 minutes at 60° C. followed by 25 minutes at 130° C.

Each clearcoat was also applied over a pre-dried (10 mins/60° C.) water-borne basecoat (a metallic silver product based on an aqueous acrylic dispersion resin and available from Akzo Coatings GmbH under the designation "40-11390 Hydro Basecoat") and baked as above. The resulting film was then evaluated as to gloss and visible appearance (body, levelling, strike-in, etc.)

In addition, each clearcoat was applied over the above hydro-basecoat which had not been pre-dried but merely allowed to flash-off at room temperature (about 23°C.) for 10 minutes, thereby simulating the wet-in-wet method of application generally used in the automobile industry for conventional base and clearcoats. The base and clearcoat were subsequently baked together as above and the resulting film was evaluated as to gloss and visible appearance.

The results are presented in Table 1.

TABLE 1

| Example | Pendulum[1] Hardness | Buchholz[2] Hardness | Erichsen[3] Deformation | Conical[4] Mandrel | Xylene resistance | Gloss[6] 20° | Appearance over HBC (pre-dried) | Gloss[7] 20° | Appearance over HBC (wet-in-wet) |
|---|---|---|---|---|---|---|---|---|---|
| CE1 | 43 | 67 | 9.4 | o.k. | fail | 83 | v. poor | 83 | v. poor |
| CE2 | 80 | 71 | 7.7 | o.k. | pass | 89 | poor | 88 | poor |
| CE3 | 114 | 95 | 4.8 | o.k. | pass | 90 | good | 90 | v. poor |
| E1 | 104 | 77 | 9.5 | o.k. | pass | 90 | excellent | 90 | excellent |
| E2 | 109 | 83 | 8.5 | o.k. | pass | 90 | excellent | 90 | excellent |
| E3 | 58 | 68 | 8.3 | o.k. | pass | 89 | good | 88 | good |
| E4 | 73 | 71 | 7.7 | o.k. | pass | 91 | good | 90 | good |
| E5 | 115 | 87 | 8.1 | o.k. | pass | 85 | good | 82 | good |
| E6 | 108 | 87 | 8.7 | o.k. | pass | 87 | good | 85 | good |

[1] according to DIN 53157 but expressed in no. of oscillations
[2] expressed in the units according to DIN 53153
[3] expressed in mm according to DIN 53156
[4] according to ASTM D 522; o.k. = no cracking
[5] Cotton wad soaked in xylene is placed on paint surface for three minutes, then the surface is scratch tested with knife
pass = no surface changes
fail = film softens
[6] according to DIN 67530; pre-dried hydro basecoat
[7] according to DIN 67530; wet-in-wet over hydro basecoat The results show a much improved hardness in comparison to the known hybrid system (CE 1) while retaining good flexibility. Cross-linking is also better, as indicated by the xylene resistance. In addition, the higher solids content (46% as against 38%) and lower level of cosolvent (13% against 19%) are particularly advantageous.

With regard to the conventional solvent-borne system (CE 3), it may be seen that the mechanical values are comparable but that improved flexibility has been attained.

The major differences, and advantages, are apparent from the visual appearance of the final coatings, where examples 1-6 show much better body and levelling properties. The known hybrid system (CE 1) also exhibits very severe strike-in, even when the basecoat is pre-dried, and the conventional system (CE 3), although producing acceptable results on pre-dried basecoat, cannot be satisfactorily applied wet-in-wet as the resulting film exhibits severe levelling and other surface defects. The CE 2 example, although not exhibiting severe strike-in, produces films lacking in body.

Many modifications and variations besides the embodiments specifically mentioned may be made in the compositions and methods described herein without substantially departing from the concept of the present invention. Accordingly, it should be clearly understood that the form of the invention described herein is exemplary only, and is not intended as a limitation on the scope thereof.

We claim:

1. A binder system suitable for use in waterborne coatings, comprising a water-soluble acrylic resin which has been modified with a monofunctional isocyanate compound, wherein the modified water-soluble acrylic resin is selected from:
   (i) the reaction product of a monofunctional isocyanate compound with a water-soluble acrylic resin produced from the polymerization of one or more hydroxyacrylic monomers and/or the copolymerization of one or more hydroxyacrylic monomers with one or more other olefinically unsaturated monomers, and
   (ii) the polymerization product of a urethane modified acrylic monomer built up from an hydroxyacrylic monomer and a monofunctional isocyanate compound and/or the copolymerization product of such urethane modified acrylic monomer with at least one hydroxyacrylic monomer and/or other olefinically unsaturated monomer; and
   wherein the monofunctional isocyanate compound is selected from:
   (a) a monoisocyanate compound of the general formula (I)

R—NCO (I)

wherein R is a $C_8$–$C_{25}$ alkyl group, and
   (b) an adduct of a polyisocyanate with an active hydrogen group-containing compound.

2. The binder system of claim 1, wherein from 60 to 99 parts by weight of the water-soluble acrylic resin is modified with from 1 to 40 parts by weight of the monofunctional isocyanate compound, the combination comprising 100 parts by weight.

3. The binder system of claim 1, wherein the monoisocyanate compound comprises stearyl isocyanate.

4. The binder system of claim 1, wherein the active hydrogen group-containing compound comprises at least one of a monohydroxy functional compound, a monoamine functional compound or a monothiol functional compound.

5. The binder system of claim 4, wherein the monohydroxy functional compound comprises one or more of:
   (1) a monohydroxy substituted carboxylic compound of the general formula (II):

$$HO-R^1-COOR^2 \quad (II)$$

wherein $R^1$ is a hydrocarbon group having from 1 to 25 carbon atoms, and $R^2$ is hydrogen or a hydrocarbon group having from 1 to 18 carbon atoms;

(2) a monoalcohol of the general formula (III):

$$HO-R^3 \quad (III)$$

wherein $R3$ is a hydrocarbon group having from 1 to 25 carbon atoms;

(3) a polyoxyalkylene glycol monoalkylether of the general formula (IV):

$$HO-[(C_3H_6O)_n/(C_2H_4O)_{nl}]-R^4 \quad (IV)$$

wherein $R^4$ is a $C_1$-$C_4$ alkyl group, n is 0 or a whole number from 1 to 25, and nl is 0 or a whole number from 2 to 40, with the proviso that $1 \leq n+nl \leq 50$; and (4) a monohydroxy substituted carboxamide compound of the general formula (V):

$$HO-R^1-CON(R^5)_2 \quad (V)$$

wherein $R^1$ is a hydrocarbon group having from 1 to 25 carbon atoms, and each $R^5$ may independently be hydrogen or a hydrocarbon group having from 1 to 18 carbon atoms.

6. The binder system of claim 5, wherein $R^1$ is an aliphatic hydrocarbon group having from 4 to 24 carbon atoms, and $R^2$ is hydrogen or a $C_1$-$C_{18}$ alkyl group.

7. The binder system of claim 6, wherein $R^1$ is an aliphatic, linear, saturated hydrocarbon group having from 12 to 20 carbon atoms, and $R^2$ is hydrogen.

8. The binder system of claim 5, wherein $R^3$ is a $C_1$-$C_{18}$ alkyl group.

9. The binder system of claim 8, wherein the monoalcohol (2) comprises one or more of ethanol, butanol, lauryl alcohol and stearyl alcohol.

10. The binder system of claim 5, wherein n is 0, nl is from 10 to 12 and $R^4$ is a methyl group.

11. The binder system of claim 4, wherein the monoamine functional compound comprises one or more of:

(5) a monoamine of the general formula (VI):

$$R^6-HN-R^3 \quad (VI)$$

wherein $R^3$ is a hydrocarbon group having from 1 to 25 carbon atoms, and $R^6$ is hydrogen or a hydrocarbon group having from 1 to 25 carbon atoms, with the proviso that the monoamine (5) should not contain more than 26 carbon atoms in total; and (6) a polyoxyalkyleneamine monoalkylether of the general formula (VII):

$$R^7-HN-(C_3H_6O)_n-(C_2H_4O)nl-R^4 \quad (VII)$$

wherein $R^4$ is a $C_1$-$C_4$ alkyl group, n is 0 or a whole number from 1 to 25, nl is 0 or a whole number from 2 to 40, with the proviso that $1 \leq n+nl \leq 50$, and $R7$ is hydrogen, a $C_1$-$C_{20}$ alkyl group or a polyoxyalkylene group of the formula $[(C_3H_6O)_n/(C_2H_4O)_{nl}]$.

12. The binder system of claim 11, wherein $R^3$ is a $C_1$-$C_{18}$ alkyl group and $R^6$ is hydrogen.

13. The binder system of claim 12, wherein the monoamine (5) comprises one or more of ethylamine, butylamine, laurylamine and stearyl-amine.

14. The binder system of claim 11, wherein $R^7$ is hydrogen, $R^4$ is a methyl group, n is from 2 to 4 and nl is from 10 to 12.

15. The binder system of claim 1, comprising an additional 100 parts by weight or less of an aqueous dispersion resin.

16. A waterborne coating composition comprising an aqueous base and a binder system, wherein the binder system comprises a water-soluble acrylic resin which has been modified with a monoisocyanate compound, wherein the modified acrylic resin is selected from:

(i) the reaction product of a monofunctional isocyanate compound with a water-soluble acrylic resin produced from the polymerization of one or more hydroxyacrylic monomers, and/or the copolymerization of one or more hydroxyacrylic monomers with one or more other olefinically unsaturated monomers, and (ii) the polymerization product of a urethane modified acrylic monomer built up from an hydroxyacrylic monomer and a monofunctional isocyanate compound, and/or the copolymerization product of such urethane modified acrylic monomer with one or more hydroxyacrylic monomers and/or one or more other olefinically unsaturated monomers; and wherein the monofunctional isocyanate compound is selected from:

(a) a monoisocyanate compound of the general formula (I)

$$R-NCO \quad (I)$$

wherein R is a $C_8$-$C_{25}$ alkyl group, and (b) an adduct of a polyisocyanate with an active-hydrogen group containing compound.

17. The binder system of claim 1, wherein the water-soluble acrylic resin has an average molecular weight (Mn) of from 500 to 20000, an hydroxyl number of from 10 to 400, and an acid value of from 5 to 150.

18. The coating composition of claim 16, further comprising a curing agent for the binder.

19. The binder system of claim 1, wherein the polyisocyanate is selected from di, tri and tetra isocyanates.

20. The binder system of claim 19, wherein the polyisocyanate is selected from diisocyanates and triisocyanates.

21. The binder system of claim 1, wherein the polyisocyanate contains 8 to 36 carbon atoms.

22. The binder system of claim 19, wherein the polyisocyanate contains 8 to 36 carbon atoms.

23. The coating composition of claim 16, wherein said water-soluble acrylic resin has an average molecular weight (Mn) of from 500 to 2000, an hydroxyl number of from 10 to 400 and an acid value of from 5 to 150.

24. The coating composition of claim 16, wherein from 60 to 99 parts by weight of the water-soluble acrylic resin is modified with from 1 to 40 parts by weight of the monofunctional isocyanate compound, the combination comprising 100 parts by weight.

25. The coating composition of claim 16, wherein the monoisocyanate compound comprises stearyl isocyanate.

26. The coating composition of claim 16, wherein the active hydrogen group-containing compound comprises at least one of a monohydroxy functional compound, a monoamine functional compound or a monothiol functional compound.

27. The coating composition of claim 26, wherein the monohydroxy functional compound comprises at least one of:

(1) a monohydroxy substituted carboxylic compound of the general formula (II):

$$HO-R^1-COOR^2 \quad (II)$$

wherein $R^1$ is a hydrocarbon group having from 1 to 25 carbon atoms, and $R^2$ is hydrogen or a hydrocarbon group having from 1 to 18 carbon atoms;

(2) a monoalcohol of the general formula (III):

$$HO-R^3 \quad (III)$$

wherein $R^3$ is a hydrocarbon group having from 1 to 25 carbon atoms;

(3) a polyoxyalkylene glycol monoalkylether of the general formula (IV):

$$HO-[(C_3H_6O)_n/(C_2H_4O)_{nl}]-R^4 \quad (IV)$$

wherein $R^4$ is a $C_1$-$C_4$ alkyl group, n is 0 or a whole number from 1 to 25, and nl is 0 or a whole number from 2 to 40, with the proviso that $1<n+nl<50$; and (4) a monohydroxy substituted carboxamide compound of the general formula (V):

$$HO-R^1-CON(R^5)_2 \quad (V)$$

wherein $R^1$ is a hydrocarbon group having from 1 to 25 carbon atoms, and each $R^5$ may independently be hydrogen or a hydrocarbon group having from 1 to 18 carbon atoms.

28. The coating composition of claim 27 wherein $R^1$ is an aliphatic hydrocarbon group having from 4 to 24 carbon atoms, and $R^2$ is hydrogen or a $C_1$-$C_{18}$ alkyl group.

29. The coating composition of claim 28, wherein $R^1$ is an aliphatic, linear, saturated hydrocarbon group having from 12 to 20 carbon atoms, and $R^2$ is hydrogen.

30. The coating composition of claim 27, wherein $R^3$ is a $C_1$-$C_{18}$ alkyl group.

31. The coating composition of claim 30, wherein the monoalcohol (2) comprises at least one of ethanol, butanol, lauryl alcohol and stearyl alcohol.

32. The coating composition of claim 5, wherein n is 0, nl is from 10 to 12 and $R^4$ is a methyl group.

33. The coating composition of claim 26, wherein the monoamine functional compound comprises one or more of:

(5) a monoamine of the general formula (VI):

$$R^6-HN-R^3 \quad (VI)$$

wherein $R^3$ is a hydrocarbon group having from 1 to 25 carbon atoms, and $R^6$ is hydrogen or a hydrocarbon group having from 1 to 25 carbon atoms, with the proviso that the monoamine (5) should not contain more than 26 carbon atoms in total; and (6) a polyoxyalkyleneamine monoalkylether of the general formula (VII):

$$R^7-HN-(C_3H_6O)_n-(C_2H_4O)nl-R^4 \quad (VII)$$

wherein $R^4$ is a $C_1$-$C_4$ alkyl group, n is 0 or a whole number from 1 to 25, nl is 0 or a whole number from 2 to 40, with the proviso that $1<n+nl<50$, and R7 is hydrogen, a $C_1$-$C_{20}$ alkyl group or a polyoxyalkylene group of the formula $[(C_3H_6O)_n/(C_2H_4O)_{nl}]$.

34. The coating composition of claim 33, wherein $R^3$ is a $C_1$-$C_{18}$ alkyl group and $R^6$ is hydrogen.

35. The coating composition of claim 34, wherein the monoamine (5) comprises at least one of ethylamine, butylamine, laurylamine and stearylamine.

36. The coating composition of claim 33, wherein $R^7$ is hydrogen, $R^4$ is a methyl group, n is from 2 to 4 and nl is from 10 to 12.

37. The coating composition of claim 16, wherein the coating composition has an acid value of from about 5 to about 150, and a hydroxyl number of from about 20 to about 250.

* * * * *